Patented Jan. 9, 1940

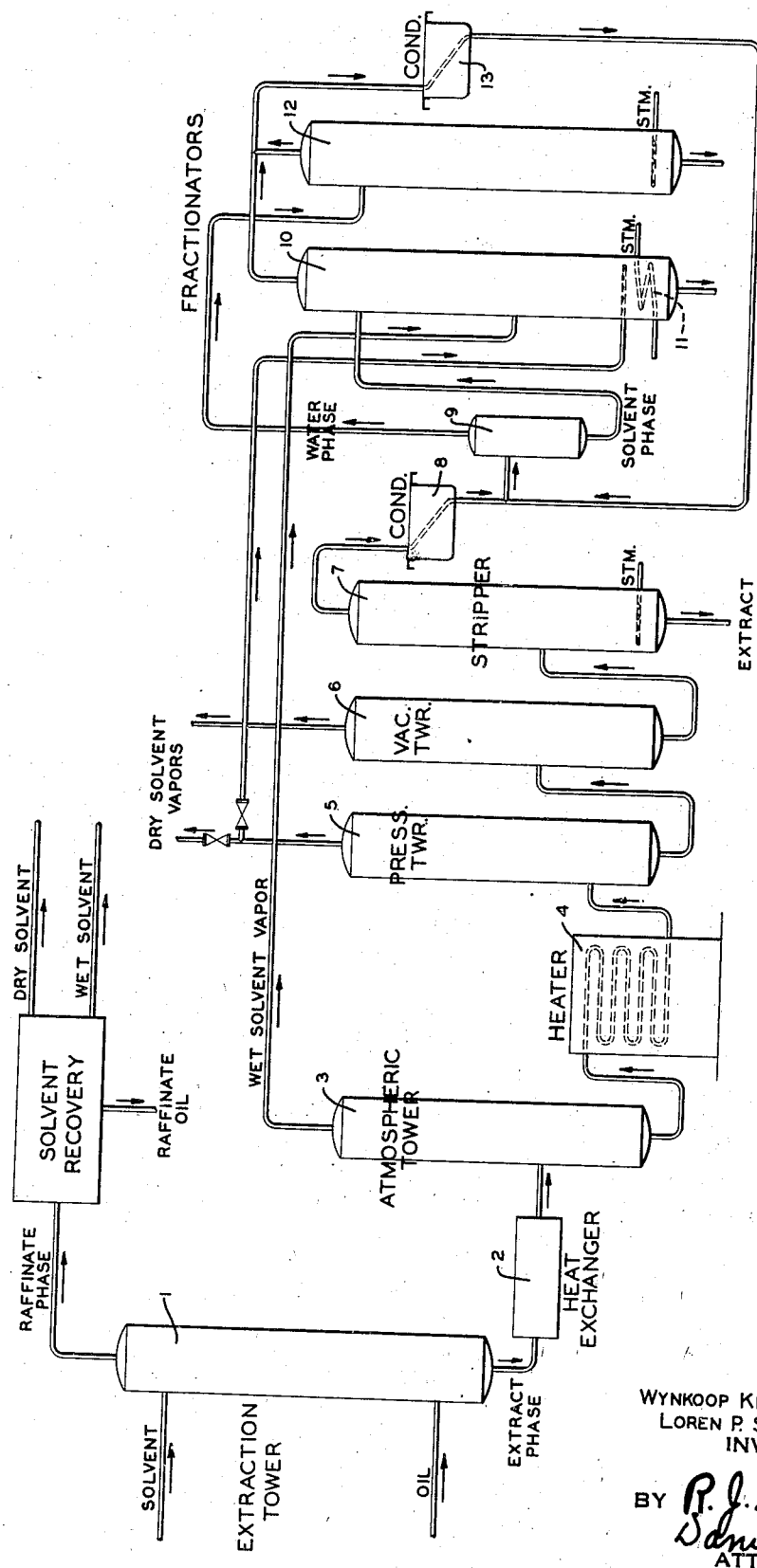

2,186,298

UNITED STATES PATENT OFFICE 2,186,298

SOLVENT REFINING OF HYDROCARBON OIL AND RECOVERY OF THE SOLVENT

Wynkoop Kiersted, Jr., Scarsdale, and Loren P. Scoville, Flushing, N. Y., assignors to The Texas Company, New York, N. Y., a corporation of Delaware Application May 25, 1938, Serial No. 209,910

5 Claims. (Cl. 202—55)

This invention relates to solvent refining of hydrocarbon oil and particularly to the recovery of the solvent from the refined oil for re-use in the process.

The invention broadly contemplates treating hydrocarbon oil, such as mineral lubricating oil, with a selective solvent, thereby forming extract and raffinate phases, the extract phase comprising a portion of the oil dissolved in the bulk of the solvent and the raffinate phase comprising another portion of the oil mixed with a small amount of solvent. It contemplates removing the bulk of the solvent from the extract and raffinate phases in a substantially dry condition. The remaining portion of the solvent is stripped from the oil with the aid of steam, producing a mixture of solvent and water. This mixture is separated into phases respectively rich in water and solvent. Each phase is then separately fractionated into distillate and residual fractions. The resulting distillate fractions are combined and recycled, while the residual fractions, one comprising solvent and the other water, are separately withdrawn.

The invention thus comprises a method of recovering a selective solvent, such as furfural, nitrobenzene, phenol, dichlorethyl ether, etc., from extract or raffinate oil by a method adapted to permit complete removal of the solvent from the oil and in substantially water-free condition, so that it is suitable for re-use without further treatment.

When a selective solvent of the foregoing character is removed from lubricating oil, for example, by vaporization, in the absence of a distilling aid, a substantial amount remains in the oil and must be distilled therefrom with the help of a distilling aid, such as steam. Due to the partial miscibility existing between the solvent and water, provision must be made for completely removing the water from the solvent. Since the presence of water usually reduces the solvent capacity of the solvent for constituents of hydrocarbon oil, it is desirable to remove the water as completely as possible, particularly in those cases where the full solvent capacity of the solvent is desired.

In such case it is desirable to obtain the solvent in a dry condition and without experiencing appreciable loss of solvent in the water discharged from the recovery system.

The invention will be further described with reference to the flow diagram shown in the accompanying drawing.

Oil to be treated, such as lubricating oil stock, is conducted from a source not shown and introduced to the lower portion of an extraction tower 1. A selective solvent, such as furfural, is introduced to the upper portion of the tower. Countercurrent contact between solvent and oil occurs within the extraction tower so that formation of extract and raffinate phases occurs.

The extract phase, comprising low viscosity index, or so-called naphthenic constituents of the oil, dissolved in the bulk of the solvent, accumulates in the bottom of the tower, while the raffinate phase, comprising high viscosity index, or so-called paraffinic constituents, mixed with a small proportion of the solvent, accumulates in the top of the tower.

The extract phase is withdrawn and passed through one or more heat exchangers 2, wherein the temperature is raised. The source of heat advantageously comprises solvent vapor or the oil from which the solvent has been stripped in subsequent steps in the recovery system.

The heated extract phase is introduced to a flash tower 3 maintained at substantially atmospheric pressure. The tower is provided with bubble trays or baffles. The extract phase is introduced at a temperature such that the lower portion of the tower is maintained at a temperature of around 330° F. The vaporized material removed from the top of this tower consists of solvent containing a small amount of water, around 1 to 2%, most of which enters the system in the charge oil.

The unvaporized material collecting in the bottom of the tower 3 is withdrawn and passed through a heater 4. The heated mixture of oil and remaining solvent is then introduced to a second tower 5, somewhat similar to the tower 3, but maintained under a pressure of around 40 pounds gauge, for example, at a temperature of around 430° F. at the bottom of the tower.

A further quantity of dry solvent is vaporized in this tower, while the unvaporized portion, still containing a substantial amount of solvent, is withdrawn, and introduced to a third tower 6 maintained under an absolute pressure of about 1 to 2 pounds and with a temperature of around 400° F. in the bottom of the tower. An additional quantity of dry solvent is vaporized and removed. The unvaporized residue collecting in tower 6 and comprising extract oil with a small amount of solvent, is withdrawn and introduced to a stripper 7. In this stripper the remaining solvent is stripped out with the aid of steam introduced at the bottom of the tower as indicated.

The residue from this stripping action comprises extract oil substantially free from solvent.

The vaporized material comprises a mixture of solvent and water.

The solvent-water vapor is condensed in a condenser 8 to form a hot condensate, which is introduced to a separator 9. The separator 9 is maintained at a temperature of around 160° F., for example, and such that phase separation occurs with the formation of an upper layer rich in water and a lower layer rich in solvent. For example, the upper layer contains around 13% furfural, where furfural is the selective solvent, while the lower layer comprises around 90% furfural.

The lower layer is withdrawn and introduced to the upper portion of a fractionator 10 provided with bubble trays or other suitable packing material. The relatively dry solvent vapor from the tower 3 is introduced to the middle of this fractionator.

This fractionator is advantageously operated under a pressure of around atmospheric, as, for example, about one or two pounds gauge. The temperature at the top of the tower is maintained at around 220 to 260° F., while the temperature at the bottom of the tower is maintained at around 330° F. Heat is supplied to the bottom of the tower by means of a closed coil 11, through which a heating medium, such as steam, is passed; this heating medium may advantageously be a portion of the dry solvent vapor produced in a preceding step, as, for example, the dry vapor removed from the tower 5, in which case it may be injected directly into the tower without the necessity of a closed coil. The unvaporized liquid collecting in the bottom of the fractionator 10 is composed of solvent substantially free from water and in a condition suitable for re-use.

The vapor leaving the fractionator comprises a mixture of solvent and water containing around 45% furfural.

The upper layer formed in the separator 9 is withdrawn and introduced to the upper portion of a fractionator 12, somewhat similar to the fractionator 10. Steam is introduced to the lower portion of this fractionator to act as a stripping agent. A temperature of around 215 to 225° F. is maintained at the bottom of the fractionator, while a temperature of around 212° F. is maintained at the top. The unvaporized liquid collecting in the bottom of this fractionator is water substantially free from solvent and is withdrawn for discharge from the system.

The vapor removed from the top of the fractionator 12 comprises a mixture of furfural and water containing around 35% furfural.

The vapor fractions withdrawn from the top of the fractionators 10 and 12 are combined and condensed in a condenser 13. The resulting condensate is then introduced to the separator 9 for recycling through this separator and the fractionators 10 and 12.

The raffinate phase removed from the top of the extraction tower, as previously referred to, is separately treated to remove the bulk of the solvent in a dry condition. Removal of the dry solvent is advantageously effected in a manner similar to that described in connection with the extract phase. The remaining solvent is recovered from the raffinate phase by steam stripping, as in the case of the extract phase, thereby producing a wet solvent or mixture of solvent and water. This mixture is advantageously introduced to the separator 9, previously referred to, wherein it is treated along with the wet solvent mixture produced in recovering the solvent from the extract phase.

The method of flow described above permits a high degree of separation of furfural from water with a minimum amount of recycling, and also permits realizing a high degree of economy in the utilization of heat.

While lubricating oil has been specifically mentioned in connection with the above description, it is contemplated that the procedure is applicable in the case of recovering solvent from other hydrocarbon fractions of mineral oil; also, while furfural has been specifically mentioned, the procedure is applicable to other types of selective solvents and with which water is partially miscible. It is also to be understood that the conditions of temperature and pressure may be varied, if desired, from those mentioned above.

Obviously many modifications and variations of the invention, as hereinbefore set forth, may be made without departing from the spirit and scope thereof, and therefore only such limitations should be imposed as are indicated in the appended claims.

We claim:

1. In the recovery of a selective solvent which is particularly miscible with water from a mixture of solvent and mineral hydrocarbon oil the steps comprising vaporizing from the oil a substantial portion of the solvent in a substantially non-aqueous condition, vaporizing remaining solvent from the oil in the presence of steam, forming a hot condensate of solvent and water, introducing said condensate to a separator, forming therein phases respectively rich in water and solvent, introducing the water-rich phase to a distilling column, distilling therefrom solvent mixed with a smaller proportion of water than that in the water-rich phase, withdrawing the unvaporized portion consisting essentially of water, introducing said solvent-rich phase to a separate distilling column, distilling therefrom water mixed with a smaller proportion of solvent than that in the solvent-rich phase, withdrawing unvaporized solvent substantially free from water from the bottom of said separate distilling column, condensing the distillate produced from both said columns, and conducting the condensed distillate to the aforesaid separator for further separation into phases in the presence of fresh solvent-water condensate.

2. The method according to claim 1 in which the solvent comprises furfural.

3. In the recovery of selective solvent which is particularly miscible with water from a mixture of mineral hydrocarbon oil and solvent wherein the bulk of the solvent is removed in substantially water-free condition and the remaining portion of the solvent is stripped from the oil with the aid of steam, thereby producing a mixture of solvent and water, the method of separating said solvent from the water comprising subjecting said solvent-water mixture to settling under conditions of temperature such that separation into phases respectively rich in solvent and water occurs, subjecting the water-rich phase to steam stripping, thereby forming a distillate fraction containing solvent with a reduced proportion of water and a residual fraction consisting essentially of water free from solvent, removing said residual fraction of water, separately subjecting the solvent-rich phase to distillation, thereby forming a distillate fraction containing water with a reduced proportion of solvent and a residual fraction consisting essentially of dry solvent, removing said residual fraction of dry solvent, and recycling both said distillate fractions back to the initial solvent-water mixture for further separation into phases in the presence of fresh solvent-water condensate.

4. In the recovery of furfural from a mixture of hydrocarbon oil and furfural wherein the bulk of the furfural is removed in substantially water-free condition and the remaining portion of the furfural is stripped from the oil with the aid of steam, thereby producing a mixture of furfural and water, the method of separating furfural from said furfural-water mixture, comprising subjecting the mixture to settling at a temperature of around 160° F. such that separation into phases respectively rich in furfural and water occurs, subjecting the water-rich phase to steam stripping at a temperature of around 212° to 225° F., thereby forming a distillate fraction containing furfural with a reduced proportion of water and a residual fraction consisting essentially of water, withdrawing said water, separately subjecting the furfural-rich phase to distillation at a temperature of around 250° to 350° F., thereby forming a distillate fraction containing water with a reduced proportion of furfural and a residual fraction consisting essentially of dry furfural, withdrawing said dry furfural, and recycling both said distillate fractions back to the initial furfural-water mixture for further separation into phases in the presence of fresh furfural-water mixture.

5. In the recovery of a selective solvent which is partially miscible with water from a mixture of solvent and mineral hydrocarbon oil the steps comprising vaporizing from the oil a substantial portion of the solvent in a substantially non-aqueous condition, vaporizing the remaining solvent from the oil in the presence of steam, forming a hot condensate of solvent and water, introducing said condensate to a separator, forming therein phases respectively rich in water and solvent, introducing the water-rich phase to a distilling column, distilling therefrom solvent mixed with a smaller proportion of water than that in the water-rich phase, withdrawing the unvaporized portion consisting essentially of water, introducing said solvent-rich phase to a separate distilling column, distilling therefrom water mixed with a smaller proportion of solvent than that in the solvent-rich phase, withdrawing unvaporized solvent substantially free from water from the bottom of said separate distilling column, condensing the distillate produced from both said columns, conducting the condensed distillate to the aforesaid separator for further separation into phases in the presence of fresh solvent-water condensate, and introducing a portion of the initially vaporized dry solvent to the second-mentioned distilling column to facilitate rectification therein.

WYNKOOP KIERSTED, Jr.
LOREN P. SCOVILLE.

CERTIFICATE OF CORRECTION.

Patent No. 2,186,298.                                              January 9, 1940.

WYNKOOP KIERSTED, JR., ET AL.

It is hereby certified that error appears in the printed specification of the above numbered patent requiring correction as follows: Page 2, second column, lines 29 and 57, claims 1 and 3 respectively, for the word "particularly" read partially; and that the said Letters Patent should be read with this correction therein that the same may conform to the record of the case in the Patent Office.

Signed and sealed this 19th day of March, A. D. 1940.

(Seal)

Henry Van Arsdale,
Acting Commissioner of Patents.